Figures 2, 3:
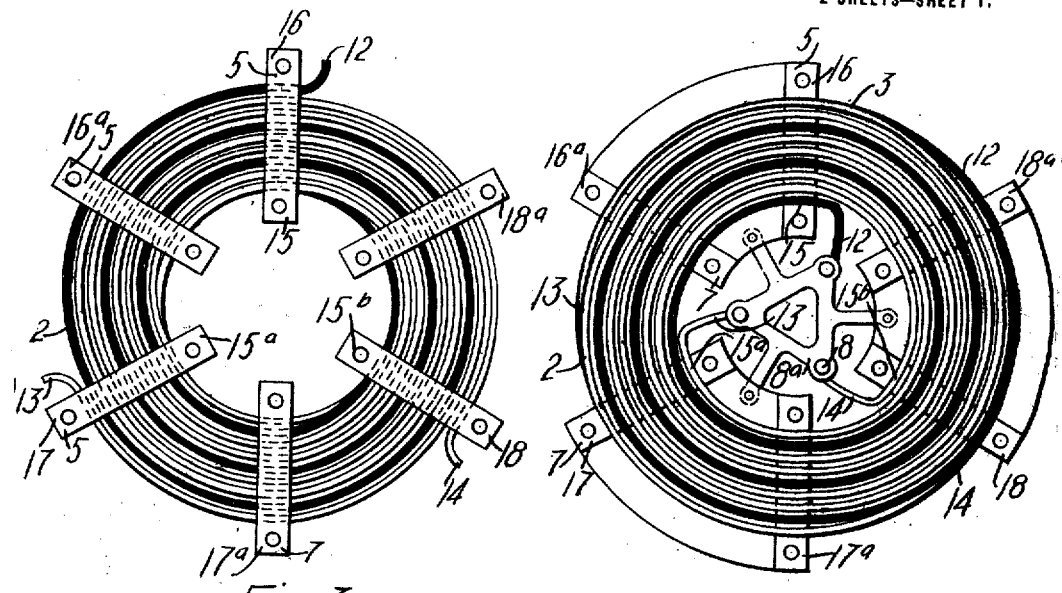

J. F. PETERS.
LIMITING REACTANCE COIL.
APPLICATION FILED FEB. 5, 1914.

1,241,549.

Patented Oct. 2, 1917.
2 SHEETS—SHEET 1.

WITNESSES:
Fred A. Lind.
Geo. W. Hansen.

INVENTOR
John F. Peters
BY
Wesley G. Carr
ATTORNEY.

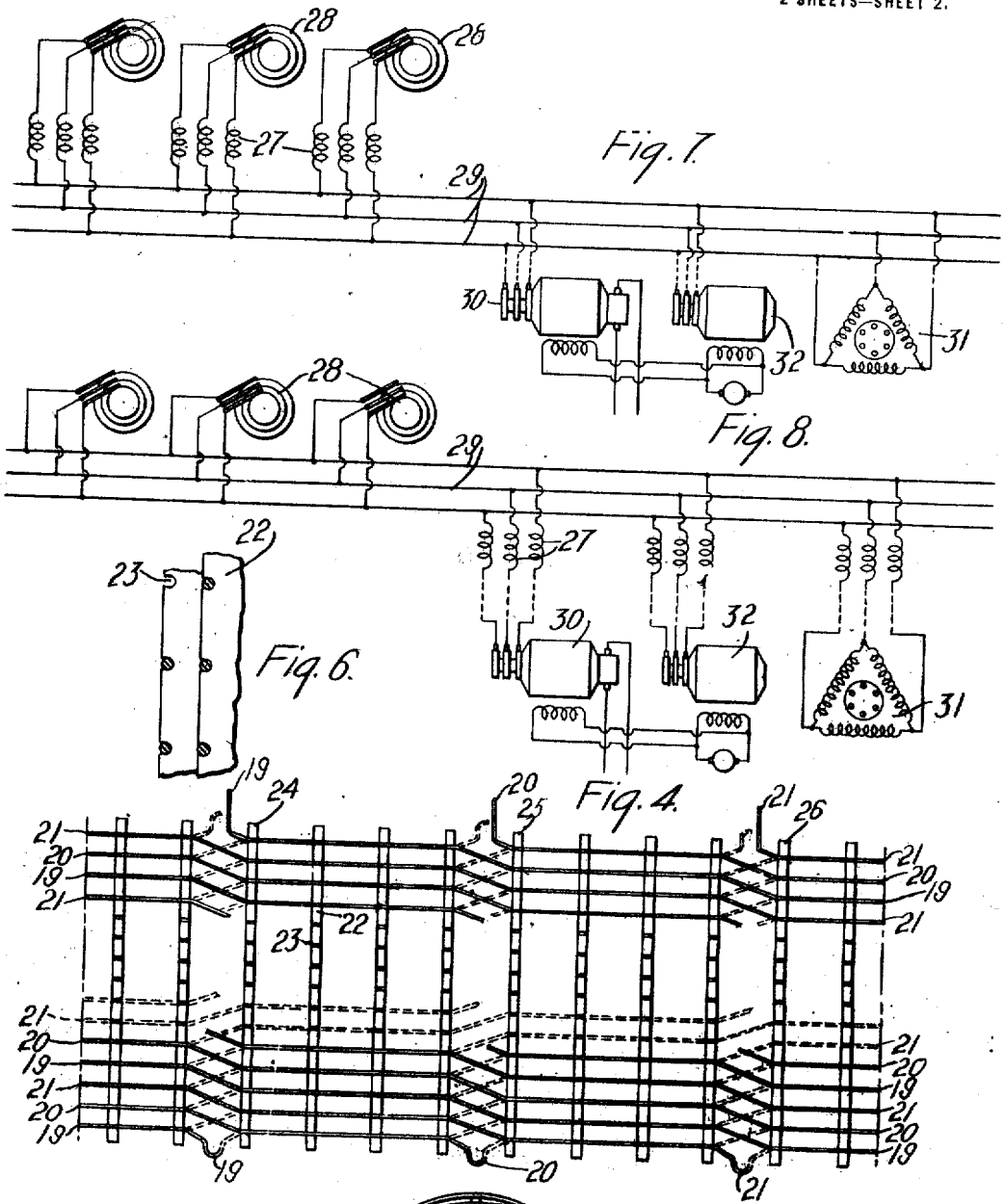

UNITED STATES PATENT OFFICE.

JOHN F. PETERS, OF PITTSBURGH, PENNSYLVANIA, ASSIGNOR TO WESTINGHOUSE ELECTRIC AND MANUFACTURING COMPANY, A CORPORATION OF PENNSYLVANIA.

LIMITING REACTANCE-COIL.

1,241,549.   Specification of Letters Patent.   Patented Oct. 2, 1917.

Application filed February 5, 1914. Serial No. 816.717.

*To all whom it may concern:*

Be it known that I, JOHN F. PETERS, a citizen of the United States, and a resident of Pittsburgh, in the county of Allegheny and State of Pennsylvania, have invented a new and useful Improvement in Limiting Reactance-Coils, of which the following is a specification.

My invention relates to current-limiting reactances, and it has particular reference to improvements in current-limiting reactances which are inserted in power circuits as protective means for the generating equipment of a power station.

In power generating systems, it is of utmost importance that the service rendered be uninterrupted, and that the power-generating apparatus be protected against short circuits, disturbances, etc., in order to insure reliability of operation. With the development of power stations having large capacity units embodied therein, it is particularly desirable to protect each of the generators from severe strains occasioned by short circuits, and to limit the possible local concentration of power at such occurrences.

When a short circuit occurs upon one of the feeders or distributing lines of a power system, each of the generators supplying power to the main feeder buses is required to furnish momentarily an abnormal load until the circuit breakers associated with the affected feeder have had time to open and thereby disconnect it from the buses, or until the speed of the generators has sufficiently decreased to prevent further current flow of an abnormal value.

Inasmuch as large-capacity high-speed turbo alternators are the usual type of electrical power generators in modern stations, severe damage may result to these generators on the occurrence of a short circuit because of their ability to maintain a high speed for an appreciable time under severe loads and because of their low internal reactance. A momentary short circuit current of 30 to 40 times full load current is not uncommon, and such quantities of current flowing in the windings of the generator may cause serious distortion and displacement of the coils. In order to limit the value of the momentary short-circuit current to an amount that will not damage the generator or seriously affect the continuity of service, a reactance is inserted in the circuit. This reactance may be inserted by adding an external power limiting reactance or by so designing the generator as to increase its self-inductive reactance, or by combining both of the above-mentioned means of increasing the reactance. My invention refers only to a power-limiting reactance that is external to the generator to which it affords protection.

One object of my invention is to furnish a power-limiting reactance which will successfully resist severe strains and be inexpensive to construct.

Another object of my invention is to provide a power-limiting reactance which will admit of thorough self ventilation of the coils comprising the same.

A further object of my invention is to design a power-limiting reactance which will have internal losses of a small value only, and which will be efficient in its operation.

Figure 1:
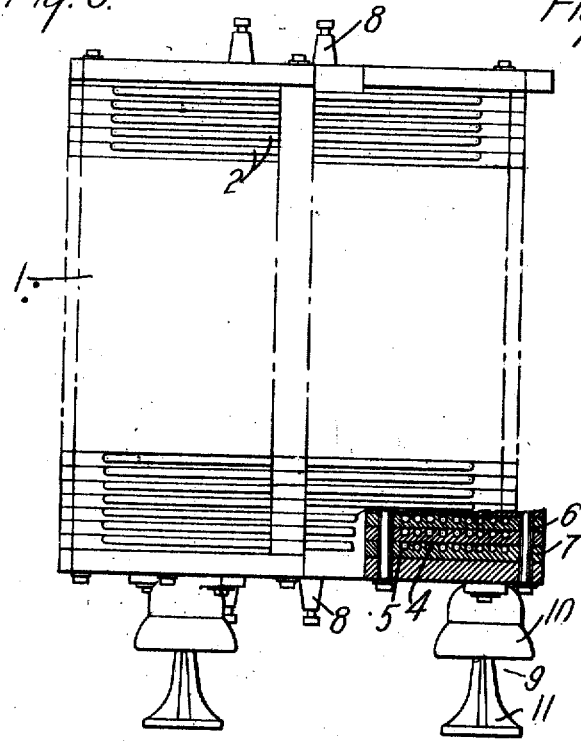

In order to understand my invention more fully, reference may be had to the following description and the accompanying drawing, in which Figure 1 is a side view, partially in section, of a reactance coil constructed in accordance with my invention; Fig. 2 is a plan view of one of the coil-sections of my reactance coil; Fig. 3 is a plan view of another one of the coil-sections which is immediately adjacent to the coil-section shown in Fig. 2. Fig. 4 is a view in development of another reactance coil which embodies my invention; Fig. 5 is a plan view of the coil of Fig. 4 in which the coil connections between adjacent and concentric coil layers are shown; Fig. 6 is a partial and cross sectional view showing the method of construction of the coil of Fig. 4; Fig. 7 is a diagrammatic representation of a distributing system embodying power-limiting reactance coils; and Fig. 8 is a diagrammatic view of another distributing system in which the power-limiting reactance coils are inserted to afford protection to generators.

Referring to Figs. 1 and 2, the reactance coil 1 of my invention comprises a plurality of flat spiral coil sections 2 which are disposed one above another. Conductors 3 of each coil section are received in recesses or notches 4 formed in radial bars 5. Longitudinally extending tie rods 6 engage the projecting portions 7 of the bars to rigidly hold the coil sections 3 in fixed positions. Binding posts 8, mounted upon the top and bottom frames 8ª, furnish proper means to effect electrical connections between the coil 1 and the desired sections of a conductor of the distributing system. Insulating supports 9, comprising porcelain insulators 10 and feet 11 associated therewith, prevent the coil 1 from grounding on the bed plate or floor upon which it may be located. Inasmuch as it is desirable for a power-limiting reactance coil to offer considerable reactance on short circuits only, it is usual to provide no core for the coil except an air core which imparts a straight line characteristic. In order that a coil having an iron core and a comparatively low reactance, may possess a straight line characteristic, it is essential to provide a very large core requiring a prohibitive amount of iron. However, it may be more economical to provide an iron core for a reactance coil of comparatively high reactance.

I prefer to provide a coil comprising several bare copper strands which are connected in multiple to furnish adequate cross sectional area for the passage therethrough of the load current without undue resistance. The use of several spaced conductors increases the heat-radiating capacity and decreases, to some extent, the internal circulating currents, thereby increasing the operating efficiency of the coil. In order to further decrease the losses occasioned by the internal circulating currents resulting from unequal potentials existing between the various conductors, I provide a new form of winding which insures a minimum amount of electrical losses in the conductors comprising the coils.

In the drawing, I have shown the winding as consisting of three conductors connected in multiple, but it will be understood that any convenient number of conductors may be used and that what is hereinafter said relative to the three conductors may be applied also with equal effectiveness to any number of conductors.

Referring to Fig. 2, three strands 12, 13 and 14, which are connected to their respective binding posts 8, are spirally wound to form the flat coil section 2, substantially as shown. The points 15, 15ª and 15ᵇ, where the conductors initially engage the radial bars 5, are equally spaced from one another on the inner periphery of the coil, the bars 5 being provided with recesses or notches 4 with which the said conductors engage and which are spaced apart to permit of thorough ventilation of the conductors.

To illustrate my method of winding each of the coil layers 2, I will describe how the conductors 12, 13 and 14 are wound when a total of three conductors are connected in multiple. The conductor 12, extending from one of the binding posts 8, engages the innermost recess formed in a radial bar 16 at 15. Continuing in the corresponding recess in a bar 16ª, the conductor 12 is then stepped radially outward to the second recess formed in a radial bar 17, while the conductor 13 initially engages the innermost recess of the same bar at 15ª. The conductors 12 and 13 engage the corresponding recesses in bar 17ª but, on reaching a bar 18, the former conductor engages the third recess thereof and the latter conductor engages the second recess, while the conductor 14 engages the innermost recess at 15ᵇ. The three conductors 12, 13 and 14 continue to engage the corresponding recesses in bar 18ª, but, on arriving at the bar 16, the conductor 14 is stepped outwardly to the second recess, the conductor 13 to the third recess, and the conductor 12 to the fourth recess, the innermost or first recess having been previously engaged by the conductor 12 at the beginning of the winding operation. In other words, each of the conductors 12, 13 and 14 constitutes a spiral, the several spirals so formed being offset with respect to one another in order that the conductors may have the same length per section of the coil. Moreover, the conductor convolutions of the several spirals thus formed are positioned alternately with respect to one another in order that the conductors may subtend equal peripheral spaces at equal distances from the center of the coil.

To illustrate, the conductors 12, 13 and 14 are severally wound to form independent spirals which alternate in position with one another in each layer or section of the coil. The conductors are also arranged so that each may, in its turn, individually occupy peripheral spaces of equal magnitude at equal radial distances from the center of the coil. In this manner, equal quantities of the symmetrically distributed magnetic flux generated by the coil may simultaneously cut the several conductors of each layer or section of the coil.

It is obvious, from the foregoing description that each of the three conductors occupies the innermost position in this layer for one-third of the periphery. As the winding operation is continued and the first layer is nearing completion, the conductor 12, after it engages the outermost recess in the bar 18ª, is stepped downwardly to engage the corresponding recess in the bar 16 of the coil layer of Fig. 3, which layer is immediately adjacent to the top layer of Fig. 2. Similarly, the conductors 13 and 14 successively occupy the outermost notches in the proper radial bars 5 of the second layer and, as shown in Fig. 3, all the conductors are wound to progress inwardly toward the center of the coil. When this coil layer is completed, the conductors are stepped to a third coil layer in which they are again wound similarly to those shown in Fig. 2. This mode of winding is continued until a sufficient number of coil layers have been wound in order to insure adequate reactance to the current-limiting coil. It is apparent that, when sufficient layers have been wound, the conductors will be extended to terminal binding posts 8, mounted at the bottom of the core structure, as shown in Fig. 1.

Inasmuch as the conductors 12, 13 and 14 occupy equal peripheral spaces in each convolution of every layer of the coil, each of the conductors is simultaneously cut by the same total number of lines of force, thus precluding the existence of unequal potentials between the various conductors. In this manner, the flow of internal circulating currents is eliminated, thereby effecting a substantial increase in the operating efficiency of my coil over that of current-limiting coils heretofore constructed.

In Figs. 4 and 5, I have shown, somewhat diagrammatically, another current-limiting reactance coil in which the internal circulating currents are eliminated by so arranging the conductors relative to the magnetic field generated by the coil that each of the conductors may be cut by substantially the same total number of lines of force during each current pulsation.

Fig. 4 is a development of the outer layer of my coil which comprises a plurality of concentric layers, as shown in Fig. 5, the total number of layers which constitute the completed coil being dependent upon the value of the reactance desired therein.

I have shown three conductors 19, 20 and 21 connected in parallel, but, as mentioned above, any convenient number of conductors may be used and, obviously, what may be said herein relative to the three conductors will refer with equal effectiveness to the chosen number of conductors.

Longitudinally extending bars 22 are provided with notches 23 which engage the conductors, the bars and the notches therein being spaced apart to permit of thorough ventilation of the coil. The bars 24, 25 and 26, which mark the points of transition for the conductors 19—20—21, are spaced equally around the periphery of each coil layer, as indicated in the development of Fig. 4. In this modification of my coil, the conductors are stepped successively downwardly or upwardly into the proper notches 23 in a manner similar to that of stepping the conductors of Figs. 2 and 3 alternately outwardly or inwardly in the successive layers as the winding operation progresses. When one of the concentric layers of the coil is completed, the conductors are wound to form the next layer and progress either upwardly or downwardly, the direction of winding being opposite to that of the layer immediately preceding.

The object of thus winding the coil is to so position each of the conductors comprising the concentric layers in identical magnetic fields that the conductors will be simultaneously cut by equal quantities of magnetic flux. This condition precludes the flow of internal circulating currents occasioned by the conductors 19—20—21, which are connected in parallel relation, having unequal potentials generated therein.

In Figs. 7 and 8, I have shown diagrammatically two electrical distributing systems employing reactance coils 27 to protect high-capacity generators 28 which feed into the main buses 29. The feeders furnish power to apparatus having a high power factor, such as rotary converters 30, to apparatus having a low power factor, such as an induction motor 31, and to a synchronous machine 32. Referring to Fig. 7, the power-limiting reactance coils 27 are inserted in the generator leads previous to their being connected to the buses 29, while, in Fig. 8, power-limiting reactance coils 27 are inserted between the feeder lines 30—31—32 and the buses 29. The aforementioned systems of employing power-limiting reactance coils are now extensively used, the advantages and disadvantages of each system being the determining factor for its adoption in the particular power installation to be made.

While I have herein shown and described several embodiments of my invention, it will be understood by those skilled in the art that various modifications may be made without departing from the spirit and scope of my invention.

I claim as my invention:

1. A reactance coil comprising a plurality of superposed spirals consisting of conductors electrically connected in multiple and severally occupying substantially peripheral spaces of equal magnitude in the convolutions of the spirals.

2. A reactance coil comprising a plurality of conductors electrically connected in parallel and severally wound in the form of spirals, the conductors occupying separate peripheral spaces of substantially equal magnitude at equal distances from the center of the coil.

3. A reactance coil comprising a plurality of spaced conductors electrically connected in parallel, the said conductors being severally wound in the form of spirals and separately occupying substantially equal peripheral spaces at equal distances from the center of the coil, a plurality of such spirals comprising each of the superposed layers forming the coil.

4. A reactance coil comprising a plurality of conductors electrically connected in parallel and severally wound in the form of independent spirals that are superposed upon one another, said conductors being so disposed relative to one another as to be simultaneously cut by equal quantities of magnetic flux.

5. A reactance coil comprising a plurality of conductors electrically connected in parallel and severally wound in the form of independent spirals, said conductors being so disposed that substantially equal segments of the independent spirals are separately cut by magnetic fields of equal intensity.

6. A reactance coil comprising a plurality of substantially concentric layers consisting of conductors electrically connected in multiple and severally occupying separate peripheral spaces of substantially equal magnitude upon circumferences formed by intersecting planes that are perpendicular to the axis of said coil.

7. A reactance coil comprising a plurality of interconnected sections each of which consists of $n$ conductors electrically connected in multiple relationship and severally wound in side-by-side spiral formations which are offset angularly displaced $\frac{360°}{n}$ with respect to one another in each of said sections whereby the lengths of each of the conductors forming the spirals of each section are equal to one another.

8. A reactance coil comprising a plurality of interconnected sections each of which consists of $n$ conductors electrically connected in multiple relationship and severally wound to form $n$ spiral formations per section, the convolutions of the several spirals of each section being positioned alternately with respect to one another and the spirals being angularly displaced $\frac{360°}{n}$ with respect to one another in each of said sections.

9. A reactance coil comprising a plurality of conductors electrically connected in parallel and severally wound in the form of superposed spirals and occupying separate peripheral spaces of substantially equal magnitude at equal distances from the center of the coil.

In testimony whereof, I have hereunto subscribed my name this 28th day of Jan. 1914.

JOHN F. PETERS.

Witnesses:
J. P. O'NEAL,
B. B. HINES.